July 10, 1962 J. O. WILSON 3,044,018

FREQUENCY DRIFT DETECTION APPARATUS

Filed Jan. 21, 1959

2 Sheets-Sheet 1

INVENTOR
JOHN O. WILSON
BY Smart & Biggar
ATTORNEYS

July 10, 1962 J. O. WILSON 3,044,018

FREQUENCY DRIFT DETECTION APPARATUS

Filed Jan. 21, 1959 2 Sheets-Sheet 2

INVENTOR
JOHN O. WILSON
BY Smart & Biggar
ATTORNEYS.

United States Patent Office 3,044,018
Patented July 10, 1962

3,044,018

FREQUENCY DRIFT DETECTION APPARATUS

John Orr Wilson, Ottawa, Ontario, Canada, assignor to Her Majesty the Queen in right of Canada, as represented by the Minister of National Defence Filed Jan. 21, 1959, Ser. No. 788,228
1 Claim. (Cl. 328—141)

The invention relates to frequency drift detection circuits for a radio receiving system adapted to receive a signal which may be shifted in frequency to any one of a plurality of predetermined frequencies. One important application of the invention is in the automatic frequency control system of teletype receivers for the reception of two channel, four frequency-shift transmission.

Automatic frequency control circuits have been known for a number of years and were used as a signal holding device in receivers for the broadcast band to reduce or eliminate the effect of receiver oscillator drifting. According to the early methods of automatic frequency control a frequency discriminator was used to detect drifting of the frequency of the receiver oscillator over a very narrow range of a few kilocycles at most. Such an arrangement was applicable to a single frequency. Later, the problem arose in teletype receivers of controlling frequency drift of a signal which might be at any one of a plurality of predetermined frequencies.

Early teletype systems used on-off keying but later systems used frequency keying. In frequency keying one transmitter frequency represents the teletype "mark" signal while another radio frequency, different from the first by a definite amount, represents the teletype "space" signal. Various types of receivers were used in teletype systems, some using frequency discriminator type of detection circuits while others used audio filters after conversion of the signal to the audio band. Attempts were made to apply automatic frequency control to teletype receivers of this type but with no great success over all the various conditions which may exist because the early circuits applied automatic frequency control to only one of the two frequencies used. The control was applied to the standby frequency, that is, the "mark" frequency, and one of the problems was that while keying, or while receiving, transients from a variety of sources could shift receiver performance so that the frequency locked on to the receiver "mark" position was that of the "space" signal.

In recent teletype systems double frequency-shift keying is used to provide two channels individually keyed. In this method there are four frequencies used, only one of which is present at one time. There is even a greater requirement for a more reliable automatic frequency control system in this type of radio communication unless the shifts of frequency are made extremely wide and the receivers correspondingly of wide response; but if this is done, many of the advantages of frequency-shift keying are lost. Because only one frequency of the four frequencies used is present at any one time there has been a need for an automatic frequency control circuit which will work at the frequency present at a given instant and which will work in an identical manner in respect to all four of the frequencies. The present invention fills this need by making available apparatus for detecting frequency drift of a signal which may be shifted in frequency to any one of a plurality of predetermined frequencies. Various known control circuits can be made responsive to the detector circuits in accordance with the invention. The need for the present invention will be still more apparent from the following explanation of known two channel, frequency-shift systems in which reference is made to actual frequency relationships:

The two channel system is based on the principle that two-element mark-space channels can be combined to form a single four element channel, in which each of the four discrete frequencies represents one of the four possible mark-space combinations shown below:

| Frequency | Channel 1 | Channel 2 |
|---|---|---|
| f1 | M (mark) | M |
| f2 | S (space) | M |
| f3 | M | S |
| f4 | S | S |

With the above arbitrary mark-space combination, the telegraphic intelligence and channel separation are accomplished as follows: when Channel 1 only is keyed the carrier frequency will shift from *f1* to *f2*. The discriminator in the receiving converter associated with Channel 1 will detect these frequency changes and reproduce the mark-space combinations keyed at the transmitter. The discriminator for Channel 2 does not detect the *f1* to *f2* shift since it is arranged to respond to frequency shifts occurring between *f1* and *f3* or *f2* and *f4*, therefore a continuous mark signal prevails on Channel 2 when the shifts are occurring between *f1* and *f2*.

With this brief description of the system it is evident that the telegraph intelligence is transmitted by shifting the carrier to any one of four frequencies for a time duration related to the telegraph code and the intelligence is recovered by frequency sensitive detecting circuits. The spacing between frequencies may be 425 c.p.s. which is under the control of the transmitter. Detection at the receiving station is accomplished by four tuned circuits each resonating at one of four discrete frequencies. These four RF frequencies are converted by several conversion stages down to the following frequencies, (at approximately 425 c.p.s. spacing):

| | C.p.s. |
|---|---|
| *f1* | 4863 |
| *f2* | 5288 |
| Centre | 5500 |
| *f3* | 5712 |
| *f4* | 6137 |

The centre (5500 c.p.s.) is the resultant frequency which would occur when the transmitter radiates on its centre or assigned frequency, i.e., *f1*, *f2*, are above the assigned frequency and *f3*, *f4* are below the assigned frequency, therefore in practice the centre frequency does not appear. As previously stated, the four tuned circuits in the telegraph demodulator are fixed to resonate at these four frequencies and cannot tolerate a deviation of more than ±50 c.p.s. without introducing false detection. Therefore all frequency determining circuits both at the transmitter and receivers must have a frequency stability of at least 1 part in $10^{-6}$. In ordinary circumstances, before the present invention, this degree of stability could be attained only with special equipment after a long stabilization period, but military requirements demand immediate reliability from a cold start without special complex frequency standard equipment. This special requirement is met by the circuit according to the present invention which, in addition to correcting automatically for any drift, serves to increase reliability while reducing complexity, bulk and weight.

Apparatus for detecting frequency drift according to the invention comprises a dual tuned frequency discriminator centred over each of the plurality of predetermined frequencies to which the signal may be shifted. Each discriminator has a lower tuned section tuned to a frequency lower than the predetermined frequency for that discriminator and higher tuned section tuned to a frequency higher than that predetermined frequency. A common input connection for the signal is provided to all the tuned sections of all the frequency discriminators and a series of diode gates are connected, one between the output of each lower tuned section and a first common load while another series of diode gates are connected one between the output of each higher tuned section and a second common load. Means responsive to differences in loading of the first and second common loads indicates drifting of the signal at any one of the predetermined frequencies.

In a preferred form of the invention the means responsive to differences in loading of the first and second common loads comprises: two amplifiers each having an input connection and an output connection, a common load impedance for the two amplifiers, the input connection of one amplifier being connected to the first common load of the diode gates and the input connection of the other amplifier being connected to the second common load, and the outputs of the two amplifiers being connected to means responsive to differences between signals appearing at the outputs. The outputs of the two amplifiers can be used in an automatic frequency control system to change the tuning of the oscillator thereby compensating for frequency drifting.

Apparatus according to the invention can be used to detect any difference, other than a predetermined desired difference, of a beat frequency relationship between a local continuous wave oscillator and any number of pre-selected continuous wave signals appearing sequentially in random fashion for short or long durations of time from a remote source. It is an important advantage of the invention that in its discriminator and gating system, which works into common loads, a high degree of interfering signal immunity is attained because the discriminator having the largest output cuts off all the other discriminators connected to the same common load.

The invention will be described further with reference to the accompanying drawings, in which FIGURE 1 is a block diagram illustrating a preferred embodiment of the invention;

Figures 1, 2:
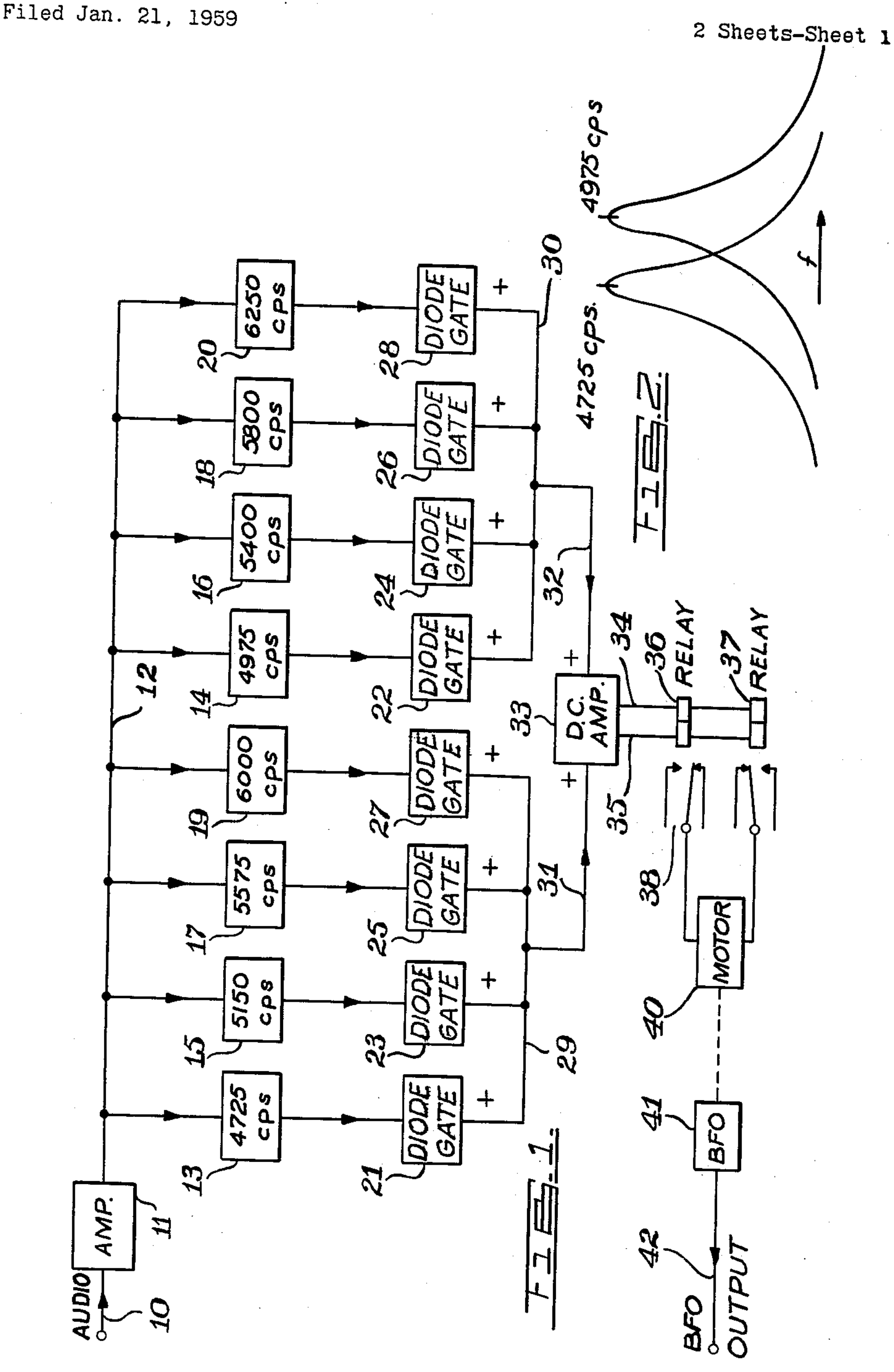
FIGURE 2 is a graph illustrating the response of two tuned circuits which form a frequency discriminator.
FIGURE 1 illustrates the invention as applied to a receiver used in a two channel, four frequency-shift telegraph system.

In the embodiment of the invention illustrated by FIGURE 1 the telegraph intelligence after conversion from the received radio frequency RF signal consists of four frequencies available at the input connection 10: 4863, 5288, 5712 and 6137 c.p.s. (cycles per second), which will be referred to below as the reference frequencies. The keying system is such that any one of these four frequencies may appear for a short or long instant of time. The frequency drift detection arrangement consists of eight tuned circuits 13–20 which are connected in parallel across the output of a buffer amplifier 11. These tuned circuits are arranged to work in four pairs, i.e., 13 and 14, 15 and 16, 17 and 18, 19 and 20. One tuned circuit of each pair resonates at a frequency which is approximately 125 c.p.s. below the reference frequency and the other tuned circuit approximately 125 c.p.s. above the reference frequency. Each pair is adjusted to produce equal voltages when the reference frequency is at the cross-over point of the two tuned circuits. FIGURE 2 shows a typical response curve of the two tuned circuits arranged to form a frequency discriminator to detect 4863 c.p.s. These curves illustrate if the reference frequency is higher in frequency than 4863 c.p.s. the voltage appearing from the tuned circuit 14 will rise while the voltage appearing at tuned circuit 13 will be less, thereby detecting the updrift of this particular frequency. The same action in reverse occurs when this frequency drifts lower in frequency. Although the frequency 4863 c.p.s. is approximately 138 c.p.s. from the resonant point of the tuned circuit 13, this tuned circuit develops a voltage far in excess of tuned circuits 15, 17 and 19 because their resonant points are farther removed from the reference frequency. This differential in voltage opens diode gate 21 and closes diode gates 23, 25 and 27. Tuned circuit 14 functions in the same manner with relation to tuned circuits 16, 18 and 20 and diode gates 22, 24, 26 and 28. In this way the combined outputs of each pair of tuned circuits passed only the voltage derived from the particular reference frequency associated with that pair of tuned circuits and cuts off any output from all other tuned circuits during the interval of time the particular reference frequency in question is present.

It should be noted that no attempt is made to correct any difference in the spacing between the four frequency shifts because this spacing can be maintained conveniently at the transmitter. Frequency instability either at the transmitter or in the conversion stages of the receiver does not affect the spacing between the four frequencies, i.e., the frequencies all drift up or down by the same amount. The main function of the embodiment of the invention now being described is to maintain the four shifts of frequencies at frequencies at which the fixed tuned circuits in the telegraph converter are set. It should also be noted that any drift in the overall communications link is of a slow nature so that if the D.C. amplifier 33 has an integrating action with a time constant of 4 seconds the effect will be obtained of smoothing out any short keying spikes that may be present.

As indicated by FIGURE 1, the two voltages at the output of the D.C. amplifier 33 when equal hold two polarized relays 36 and 37 open. Any differential in voltage closes one relay and provides additional power to hold the other relay open. The relays 36 and 37 are connected to control the stopping, starting and rotational direction of a motor 40, which controls the frequency of a local conversion oscillator 41. Any change in any one of the reference frequencies causes the motor 40 to turn in a direction which by changing the frequency of the local conversion oscillator 41 will bring the beat difference frequency back to the proper reference frequency.

The apparatus just described can be used to detect additional information. As stated above, the amplifier 33 has two D.C. inputs 31 and 32 and this amplifier has a long time constant. Also, it is to be remembered that the four carrier shifts used to convey the telegraphic information and channel separation can deviate ±50 c.p.s. without impairing the performance of the system. The invention when applied in the role of an automatic frequency control device holds all frequencies well within these limits, say at ±20 c.p.s. Therefore if it is desired to do so, during transmission of regular data, all frequencies at the transmitter can be deliberately shifted up or down 50 c.p.s. for a time duration of .1 to 1. seconds; this sudden change will appear at the two D.C. inputs 31 and 32 to the amplifier 33 without appearing at the amplifier outputs 34 and 35, and this change at the inputs 31 and 32 can be used to actuate some other device while at the same time not affecting regular incoming data. This additional information can be applied to known closed loop error correcting systems, remote control systems etc. In the prior art arrangements valuable circuit time is lost in error detecting and correcting systems because transmission in both directions is stopped when an error is indicated at either end. The capability of a system embodying the present invention to detect any superimposed information eliminates the need to stop the regular data information while a repeat signal is being sought.

Figure 3:
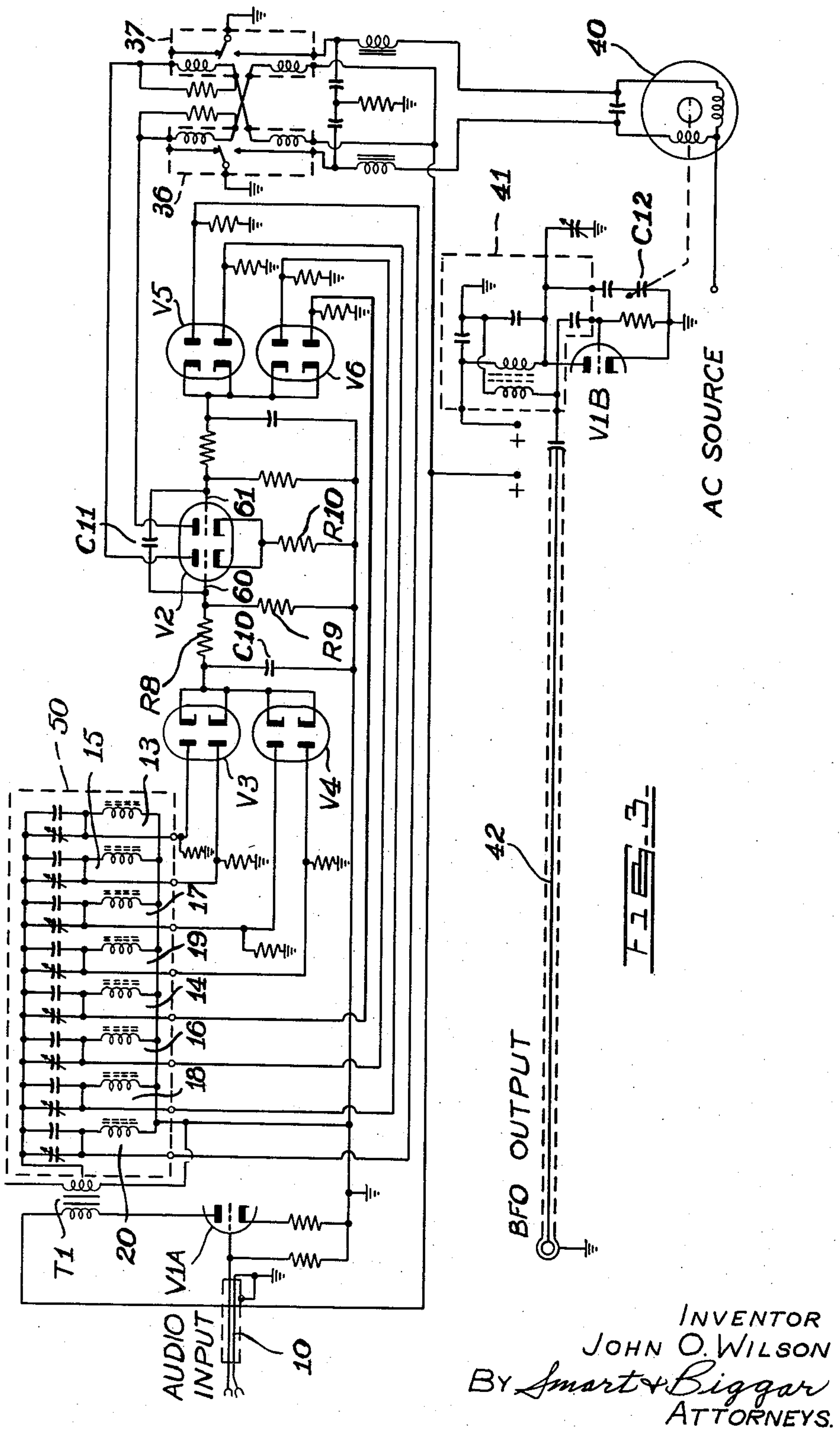
FIGURE 3 is a schematic diagram illustrating an embodiment of the invention.

Referring to FIGURE 3, a tube V1A having an input connection 10 acts as a buffer stage which passes any one of the four signals through the impedance matching transformer T1 to the discriminator 50 which contains eight series tuned circuits 13, 14, 15, 16, 17, 18, 19 and 20. These tuned circuits are connected in parallel across the transformer T1. The four tuned circuits designated by odd numbers are tuned lower than the centre reference frequencies while those designated by even numbers are tuned higher than the centre reference frequencies.

Tubes V3 and V4 are two twin diodes which function as a diversity gating circuit. The gating action between the odd number tuned circuits is accomplished by connecting the anode of each diode to the inductance-capacitance junction, a high impedance point, to one of the four tuned circuits. The four cathodes are all connected to a common load resistive path R8 and R9 to the grounded common side of all the tuned circuits. A capacitor C10 shunts the common cathode resistors R8 and R9 to smooth the half wave rectified D.C. output. The action of the diodes V3 and V4 connected in this circuit configuration is such that any diode looking at a voltage derived from its associated tuned circuit that is higher than the voltage derived from any one of the other three tuned circuits makes the cathodes of the associated diodes positive with respect to their anodes thereby back biasing these diodes to cut off, i.e., closing the gates.

This action therefore provides a controlling voltage at point 60 at the grid of the D.C. amplifier tube V2, and this controlling voltage is derived from one only of the incoming signals at any instant.

The tuned circuits designated by the even numbers which are tuned higher than the centre reference frequencies are gated in the same manner as the other tuned circuits by the diodes V5 and V6. The D.C. output of these four gates are connected to the point 61 at the other grid of the dual triode V2 of the D.C. differential amplifier.

An odd and even number, e.g. 13 and 14, tuned circuit forms a discriminator of which the cross-over point is at the reference frequency, at which frequency there are equal voltages appearing at the grids of the D.C. differential amplifier tube V2. The cathode of the two D.C. amplifier sections of the tube V2 has a common load resistor R10 causing further increase of the differential resulting from any difference in voltages appearing at the grids of the tube V2. The capacitor C11 connected between the grids of the D.C. amplifier tube V2 serves to provide a time delay to smooth out any instantaneous difference of voltages which are not of a persistent nature appearing at the grids of the tube V2.

To illustrate further the function of this circuit. If the reference frequency associated with tuned circuits 13 and 14 drifts higher, the voltage will rise in the tuned circuit 14 and decrease in the tuned circuit 13 which has already opened its respective gating diodes so that a higher voltage will be presented at the grid 61 and a lower voltage at the grid 60 of the dual amplifier tube V2. This differential will be further increased since the increase in gain of one amplifier will automatically reduce the gain of the other.

As shown in FIGURE 3, the anode current of each amplifier of the dual amplifier V2 serves to control two polarized relays 36 and 37. The connections to the winding are arranged so that when the currents in the anodes are equal the contacts controlling the motor 40 are open. When the current increases at one anode and reduces at the other anode the current differential creates an increase in current through the operating winding of one relay and a decrease in current through its bias winding thereby closing the contacts. Under this condition the action is reversed in the other relay, i.e., the operating current reduces and the bias current increases which holds its contacts open. The motor 40 is arranged to operate a tuning condenser C12 which adjusts the frequency of the signal from the beat frequency oscillator 41 supplied by the connection 42 to the remainder of the receiving system (not shown).

What I claim as my invention is:

Apparatus for detecting and correcting frequency drift of a narrow band signal which is shifted in frequency to any one of four predetermined frequencies in a double frequency shift system, said apparatus comprising four dual series-tuned frequency discriminators, one of the frequency discriminators being centred over each predetermined frequency by having a lower series-tuned section tuned to a frequency lower than said predetermined frequency and a higher series-tuned section tuned to a frequency higher than said predetermined frequency, a common input connection for said signal to all the series-tuned sections of all the frequency discriminators, a diode gate associated with each said lower series-tuned section and series connected between the output of the associated said lower series-tuned section and a first load common to all the diode gates associated with said lower series-tuned section, a diode gate associated with each said higher series-tuned section and series connected between the output of the associated said higher series-tuned section and a second load common to all the diode gates associated with said higher series-tuned sections, and means for adjusting the frequency of said signal in response to differences in loading of the first and second common loads.

References Cited in the file of this patent

UNITED STATES PATENTS

| | | |
|---|---|---|
| 2,349,881 | Peterson | May 30, 1944 |
| 2,354,827 | Peterson | Aug. 1, 1944 |
| 2,451,584 | Stone | Oct. 19, 1948 |
| 2,702,852 | Briggs | Feb. 22, 1955 |